US012795189B2

(12) United States Patent
Sharifi et al.

(10) Patent No.: US 12,795,189 B2
(45) Date of Patent: Nov. 10, 2026

(54) VOICE-BASED SCENE SELECTION FOR VIDEO CONTENT ON A COMPUTING DEVICE

(71) Applicant: GOOGLE LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 92 days.

(21) Appl. No.: 18/923,464

(22) Filed: Oct. 22, 2024

(65) Prior Publication Data

US 2025/0047930 A1 Feb. 6, 2025

Related U.S. Application Data

(63) Continuation of application No. 17/902,601, filed on Sep. 2, 2022, now Pat. No. 12,149,773.

(60) Provisional application No. 63/399,921, filed on Aug. 22, 2022.

(51) Int. Cl.

| | |
|---|---|
| ***H04N 21/422*** | (2011.01) |
| ***G06V 20/40*** | (2022.01) |
| ***G10L 15/22*** | (2006.01) |
| ***G10L 25/57*** | (2013.01) |
| ***H04N 21/472*** | (2011.01) |

(52) U.S. Cl.

CPC ....... *H04N 21/42204* (2013.01); *G06V 20/40* (2022.01); *G10L 15/22* (2013.01); *G10L 25/57* (2013.01); *H04N 21/42203* (2013.01); *H04N 21/472* (2013.01); *G06V 2201/10* (2022.01); *G10L 2015/223* (2013.01)

(58) Field of Classification Search

CPC ....... H04N 21/42204; H04N 21/42203; H04N 21/472; G06V 20/40; G06V 2201/10; G06V 10/74; G06V 20/46; G06V 20/70; G10L 15/22; G10L 25/57; G10L 2015/223

USPC .......................................................... 704/251

See application file for complete search history.

(56) References Cited

U.S. PATENT DOCUMENTS

| | | | |
|---|---|---|---|
| 8,913,189 B1 | 12/2014 | Mincher et al. | |
| 9,569,533 B2 * | 2/2017 | Barsook | G06F 16/248 |
| 12,009,014 B2 * | 6/2024 | Lau | G11B 27/034 |
| 2016/0098998 A1 | 4/2016 | Wang et al. | |
| 2016/0275187 A1 | 9/2016 | Chowdhury et al. | |
| 2019/0341028 A1 | 11/2019 | Loghmani et al. | |
| 2021/0192561 A1 * | 6/2021 | Hage | G06Q 30/0241 |
| 2022/0345778 A1 * | 10/2022 | Bradley | H04N 21/8541 |
| 2024/0064363 A1 | 2/2024 | Sharifi et al. | |

* cited by examiner

*Primary Examiner* — Thierry L Pham

(74) *Attorney, Agent, or Firm* — Gray Ice Higdon

(57) ABSTRACT

Voice-based interaction with video content being presented by a media player application is enhanced through the use of an automated assistant capable of identifying when a spoken utterance by a user is a request to playback a specific scene in the video content. A query identified in a spoken utterance may be used to access stored scene metadata associated with video content being presented in the vicinity of the user to identify one or more locations in the video content that correspond to the query, such that a media control command may be issued to the media player application to cause the media player application to seek to a particular location in the video content that satisfies the query.

20 Claims, 6 Drawing Sheets

VOICE-BASED SCENE SELECTION FOR VIDEO CONTENT ON A COMPUTING DEVICE

BACKGROUND

Computing devices have become ubiquitous in everyday life for various purposes, including business, education, and entertainment. In addition, user interaction with computing devices has increasingly relied on interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users") may provide commands and/or requests to an automated assistant using spoken natural language input (i.e., utterances), which may in some cases be converted into text and then processed, and/or by providing textual (e.g., typed) natural language input. An automated assistant generally responds to a command or request by providing responsive user interface output, which may include audible and/or visual user interface output.

Automated assistants enable users to obtain information, access services, and/or perform various tasks. For example, users are able to execute searches, get directions, and in some cases, interact with on-device applications and third party computing services. Users may also be able to perform a variety of actions, such as calling cars from ride-sharing applications, ordering goods or services (e.g., pizza), controlling smart devices (e.g., light switches), making reservations, initiating playback of media content such as audio and/or video content, etc.

Automated assistants may converse with users using voice recognition and natural language processing, with some also utilizing machine learning and other artificial intelligence technologies, for instance, to predict user intents. Automated assistants may be adept at holding conversations with users in natural, intuitive ways, in part because they understand dialog context. To utilize dialog context, an automated assistant may preserve recent inputs from the user, questions that came from the user, and/or responses/questions provided by the automated assistant. Automated assistants may also be generally aware of the state of a computing device when commands or requests are made by users, such that the state may also be considered when attempting to determine a user's intent.

Viewing various types of on-demand media content, including video content such as movies, TV shows, documentaries, instructional videos, news programs, etc. has also become a significant use of many computing devices. Such content is often consumed through media player applications and services, and automated assistants have been used to facilitate various aspects of interacting with such content, including finding relevant content, initiating playback of such content, and even in some instances providing rudimentary playback controls such as starting/stopping playback or seeking forward or back in the content. Searching within the content, however, is often slow and cumbersome, and may require a user to iteratively seek forward and/or backward to different locations in the content and briefly start and stop playback at each of those locations until a desired location in the content is found.

SUMMARY

Techniques are described herein for enhancing voice-based interaction with video content being presented by a media player application, through the use of an automated assistant capable of identifying when a spoken utterance by a user is a request to playback a specific scene in the video content. In particular, a query identified in a spoken utterance may be used to access stored scene metadata associated with video content being presented in the vicinity of the user to identify one or more locations in the video content that correspond to the query, such that a media control command may be issued to the media player application to cause the media player application to seek to a particular location in the video content that satisfies the query.

Therefore, consistent with one aspect of the invention, a method implemented by one or more processors may include receiving, from a user and via a computing device, a spoken utterance that includes a query, identifying video content being presented in a vicinity of the user by a media player application when the spoken utterance is received from the user, accessing scene metadata associated with the identified video content, where the scene metadata includes, for each of one or more respective scenes in the identified video content, semantic scene description data describing the respective scene and timestamp data identifying one or more locations in the identified video content corresponding to the respective scene, determining, based on the query and the scene metadata associated with the identified video content, whether the query in the spoken utterance is a scene playback request directed to the media player application to play a requested scene in the identified video content, in response to determining that the query in the spoken utterance is a scene playback request, causing a media control command to be issued to the media player application to cause the media player application to seek to a predetermined location in the identified video content corresponding to the requested scene and identified in the timestamp data of the scene metadata for the identified video content, and in response to determining that the query in the spoken utterance is not a scene playback request directed to the media player application, causing a non-scene playback request operation to be executed for the query included in the spoken utterance.

In some implementations, the computing device is a first computing device and the media player application executes on a second computing device. Also, in some implementations, the first computing device is a mobile phone or assistant computing device in the vicinity of the second computing device.

Further, in some implementations, identifying the video content includes receiving an identification of the video content from the media player application through an application programming interface (API) supported by the media player application. In some implementations, identifying the video content is performed by an automated assistant, and the media player application is a third party application accessible by the automated assistant. In addition, in some implementations, identifying the video content includes initiating image, audio, and/or textual analysis of video, audio, and/or textual data of the identified video content presented during playback of the identified video content by the media player application.

In some implementations, causing the media control command to be issued to the media player application includes causing the media control command to be communicated to the media player application through an application programming interface (API) supported by the media player application. In addition, in some implementations, causing the media control command to be issued to the media player application is performed by an automated assistant, and the media player application is a third party application accessible by the automated assistant. Moreover, in some implementations, the media player application and the automated assistant execute within a common operating system environment, and the common operating system environment manages issuance of the media control command from the automated assistant to the media player application.

In some implementations, the non-scene playback request operation includes causing a search to be executed to identify one or more candidate responses for the query included in the spoken utterance, and causing a given candidate response, from among the one or more candidate responses, to be provided for presentation to the user via the computing device. Moreover, in some implementations, the non-scene playback request operation includes determining, based on the query, whether the query in the spoken utterance is a scene display request directed to a lighting system to display a requested lighting scene with one or more lights of the lighting system, and in response to determining that the query in the spoken utterance is a scene display request, causing a lighting command to be issued to the lighting system to display the requested lighting scene with the one or more lights of the lighting system.

In addition, some implementations may include a system including one or more processors and memory operably coupled with the one or more processors, where the memory stores instructions that, in response to execution of the instructions by one or more processors, cause the one or more processors to perform any of the aforementioned methods. Some implementations may also include at least one non-transitory computer-readable medium including instructions that, in response to execution of the instructions by one or more processors, cause the one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Implementations consistent with the invention may be used to enhance voice-based interaction with video content being presented by a media player application, e.g., through the use of an automated assistant that is capable of identifying when a spoken utterance by a user is a request to playback a specific scene in the video content. In some implementations, video content being presented by the media player application in the vicinity of a user may be identified, and a query identified in a spoken utterance may be used to access stored scene metadata associated with the identified video content to identify one or more locations in the video content that correspond to the query. By doing so, a media control command may be issued to the media player application to cause the media player application to seek to a particular location in the video content that satisfies the query.

Figure 1:
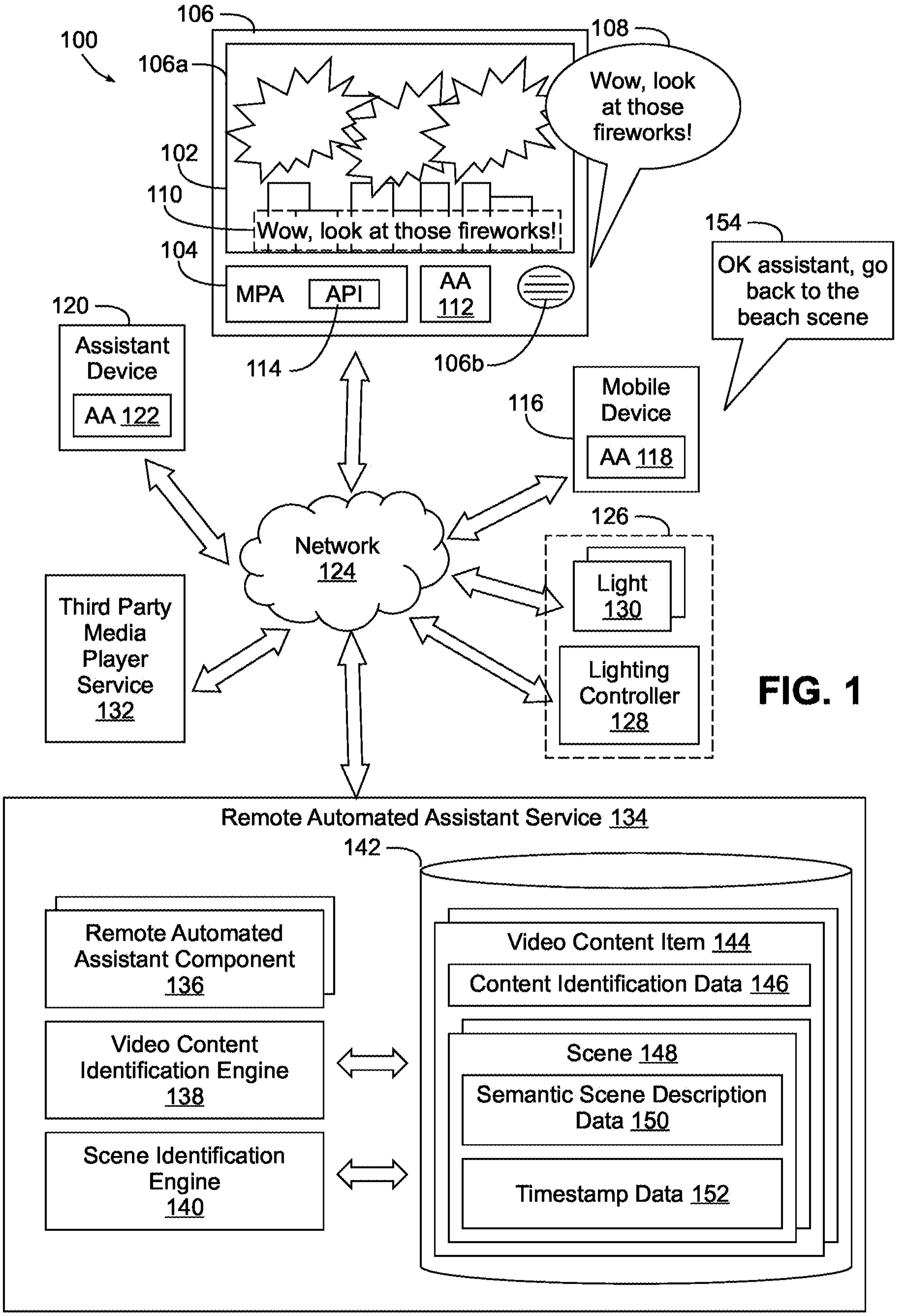
FIG. 1 is a block diagram of an example computing environment in which implementations disclosed herein may be implemented.

FIG. 1, for example, illustrates an example computing environment or system 100 consistent with some implementations of the invention, and suitable for performing voice-based scene selection on video content 102 being presented in the vicinity of a user, e.g., by a media player application 104 executed on a television or monitor 106. It will be appreciated that television or monitor 106 may include both video and audio playback devices, e.g., a display 106 and one or more speakers **106*b***.

Video content, in this regard, may include various types of media content, including interactive and/or non-interactive content, that incorporate a video or visual component. It will be appreciated, however, that in many instances video content may additionally include other content, e.g., audio content (including, in some instances, multiple audio streams in one or more languages), textual content such as closed captioning information, metadata describing the video content, etc. FIG. 1, for example, illustrates that video content 102 additionally includes audio content 108, e.g., as presented by speaker **106*b* of television or monitor 106, as well as textual content 110 (e.g., closed captioning information) presented as an overlay on display 106*a***.

In the illustrated implementation, television or monitor 106 additionally includes an automated assistant 112 that may be configured to interact with media player application 104, e.g., using an application programming interface (API) 114, in order to perform voice-based scene selection as described herein. It will be appreciated, however, that a media player application and an automated assistant used in connection with voice-based scene selection need not be resident on the same computing device in some implementations, and may be resident on other types of computing devices in some implementations. For example, an automated assistant may be resident, for example, in a mobile device 116 such as a tablet or mobile phone, as is the case with automated assistant 118. As another example, an automated assistant may be resident in an assistant computing device, as is the case with automated assistant 122. An assistant computing device may be considered to include various types of computing devices that incorporate automated assistant functionality, e.g., smart speakers, smart displays, smart appliances, etc. In some instances, the computing device that hosts the automated assistant, and that receives a scene playback request, will be in the vicinity of the computing device that hosts the media player application.

Likewise, a media player application 104 may be resident on various types of computing devices. Rather than being implemented within television or monitor 106, for example, a media player application may be resident on a digital media player or streaming box, on a mobile device (e.g., mobile device 116), on a laptop or personal computer, etc. As will become apparent below, while in some instances a media player application and an automated assistant may be available from the same entity, in other instances, from the perspective of an automated assistant, a media player application may be considered to be a third party application that is provided by a different entity than that providing the automated assistant.

In addition, in some instances, both a media player application and an automated assistant may be resident on the same computing device, e.g., a mobile device. Further, in some instances, a media player application and an automated assistant may execute within a common operating system environment that manages the issuance of various commands between the components, including, for example, a media control command from the automated assistant to the media player application, as will be described in greater detail below.

A network 124 may provide communication between various computing devices hosting media player applications and/or automated assistants, e.g., television or monitor 106, mobile device 116 and assistant device 120. In addition, in some instances, other computing devices, services and/or systems may also be accessible over network 124. For example, in some implementations one or more systems such as a lighting system 126, including a lighting controller 128 and a plurality of lights 130, may be accessible over network 124, and controllable by an automated assistant to operate lights 130, in a manner that will be discussed in greater detail below.

In addition, in some implementations, a media player application may also be implemented as a service, e.g., a third party media player service 132. In some such implementations, for example, video content may be presented in a generic web browser executing on a computing device, with some or all of the media player application functionality handled in the remote media player service.

In addition, a remote automated assistant service 134, e.g., implemented as a cloud service, may be accessible via network 124, and may include various components utilized in connection with voice-based scene selection as described herein. For example, one or more remote automated assistant components 136 may be provided to interact with an automated assistant resident on one of the aforementioned computing devices. It will be appreciated that in different implementations, automated assistant functionality may be implemented entirely locally within a computing device, implemented entirely remotely from a computing device within a remote service, or implemented in a distributed fashion, with some functionality implemented within a computing device and some implemented within a remote service, so in many implementations the remote automated assistant components may be used to interact and support any automated assistant resident on a computing device. As the manner in which software functionality may be allocated between a computing device and a remote service accessible thereto may vary greatly in different applications based upon various factors such as computational overhead, storage requirements, bandwidth requirements, latency requirements, etc., it will therefore be appreciated that the invention is not limited to any specific allocation of software functionality described herein.

A video content identification engine 138 may be provided to assist with the identification of video content being presented in a vicinity of a user by a media player application, while a scene identification engine 140 may be provided to assist with the identification of a scene in a particular video content item, such that, for example, when a user issues a scene playback request, the video content identification engine 138 may be accessed to determine what video content is currently being presented in the vicinity of the user, and the scene identification engine 140 may be accessed to determine, based upon the request and the identified video content item, a particular location in the identified video content item that corresponds to the request. In some instances, queries issued to an automated assistant may also be used to identify video content, e.g., the same query within which a scene playback request is issued (e.g., "play the birthday party scene from movie A"), or from a prior query (e.g., when the query "play movie A" is issued before the query "play the birthday party scene").

While engines 138, 140 may utilize separate data repositories in some implementations, in the illustrated implementation, a data repository 142 is provided in service 134 to maintain scene metadata for various video content items. Scene metadata, in this regard, may include practically any information that describes a particular scene in a particular video content item, and that at least enables one or more locations in the video content item that are associated with the scene to be accessed during playback of the video content item. Generation of such scene metadata in some instances is performed offline such that it is available to an automated assistant whenever a scene playback request is received.

Specifically, in the illustrated implementation, each video content item may include a corresponding video content item record 144, which includes content identification data 146 that identifies the video content item. The content identification data 146 in some instances may include data that explicitly identifies the video content item, e.g., a title, and unique identifier, bibliographic information, a SKU number, a web address, etc. In some instances, for example, a unique identifier may be provided by a media player application in response to a request made by an automated assistant, e.g., through an API of the media player application.

In some instances, content identification data 146 may be used to implicitly identify the video content item. For example, a digital fingerprint may be established for the video, audio and/or textual content of a video content item, such that, for example, image, audio and/or textual analysis may be performed on video content that is being presented to a user by a media player application to identify the video content based upon a comparison against the digital fingerprints of video content items maintained in data repository 144.

In addition, for at least a subset of the video content items, one or more records 148 may be provided to identify one or more scenes in the video content item. For each scene, semantic scene description data 150 may be provided to supply scene metadata that describes the scene based upon the content of the scene, and timestamp data 152 may be provided to identify one or more locations in the video content corresponding to the scene.

The semantic scene description data 150 may include practically any information describing the content of the scene, e.g., a title, a description, the actor(s) involved, notable dialogue, plot information, etc. For instructional video content such as how to videos, scenes may be identified by steps in a multi-step process. It will be appreciated that practically any information that makes a particular scene unique or notable and/or that may be the subject of a scene playback request, may be used as semantic scene description data.

FIG. 1, for example, illustrates the playback of a "fireworks" scene, and it will be appreciated that each of video content 102, audio content 108, and textual content 110 of the scene being presented by media player application 104 are all consistent with a scene where fireworks are being shown. If, for example, a user makes a spoken utterance such as "OK assistant, go back to the beach scene", as illustrated at 154 (which could be received by any of automated assistants 112, 118 or 122), a determination may be made that the spoken utterance includes a query that qualifies as a scene playback request directed at the video content item being presented on television or display 106, and semantic scene description data for other scenes in the same video content item may be accessed to identify a scene that matches the request (e.g., a scene where a beach is being shown).

The timestamp data 152 for each scene may identify one or more specific locations in the video content corresponding to the scene. In some implementations, a single location may be mapped to each scene, while in other implementations, multiple locations (e.g., the start, end, or one or more points in the scene) may be associated with a particular scene. A location may be identified by a time or other offset in the video content item in some implementations, while in some implementations, scenes may correspond to chapters or other logical markers in a video content item. Any data that enables an automated assistant to instruct a media player application to seek to a desired location in the video content item may be used.

Thus, for example, in the implementation of FIG. 1, in response to the spoken utterance 154 while video content 102 is being presented to a user by media player application 104, semantic scene description data 150 for one or more scenes 148 of video content 102, may be accessed to determine whether a query in the spoken utterance (e.g., "go back to the beach scene") is a scene playback request directed to the media player application to play a requested scene in video content, and if so, cause a media control command to be issued to media player application 104 to cause media player application 104 to seek to a predetermined location in the video content corresponding to the requested scene and identified in timestamp data 152 for the requested scene (e.g., a timestamp corresponding to the beginning of the beach scene). In some implementations, for example, an automated assistant may issue a media control command to media player application 104, e.g., through API 114. Conversely, if, for example, video content 102 is not found to have any scene 148 having semantic scene description data 150 that corresponds to a beach scene, a determination may be made that the query in the spoken utterance is not a scene playback request directed to media player application 104, and may instead cause a non-scene playback request operation to be executed for the query included in the spoken utterance. In addition, in some implementations, if direct control over the media player application is not available or supported, an automated assistant, for example, may control the user interface of the media player application on behalf of the user to cause the desired scene to be presented.

The semantic scene description data and timestamp data maintained in data repository 142 may be generated in various manners, and is generally generated prior to processing a spoken utterance by a user incorporating a scene selection request. In some implementations, such data may be derived using a combination of processing the video content itself and also processing other known metadata such as web pages that refer to the video content. The video content may be processed using visual understanding models that can recognize visual objects in a scene and used to label specific frames semantically. For example, a particular frame or scene may be labelled "car chase" based upon visual analysis that detects multiple vehicles traveling erratically and/or at a high speed. A separate model may also be run to process the audio stream to derive sound events such as "glass breaking" or spoken content. Text understanding models may also be used to process web pages that are known to accompany the content, as well as video subtitles, e.g., as obtained from the video content or from automatic speech recognition. Different architectural models may be used in other instances, and in some instances, an end-to-end model could be developed to take as input (query, video content, and context), and output a (start time, duration) index in the video content.

It will be appreciated that a query that implements a scene playback request may be formulated in various manners in different implementations, and may be a natural language request in some instances, and may include practically any type of information capable of identifying a scene, such that a comparison of the query with the semantic scene description data may be performed to identify a most likely scene in the video content, if any, that matches the query. In some implementations, for example, a machine learning model may be configured to emit embeddings for a query and compare them with embeddings for semantic scene description data, with the candidate with the closest similarity chosen. In addition, in the event that a query is not found to be a scene playback request, various types of non-scene playback request operations may be performed based upon further analysis of the query. In some instances, semantic scene description data that is analyzed in response to a query may be limited to the identified video content, while in other instances, semantic scene description data for other video content may also be analyzed, potentially with a bias towards scenes in the identified video content. In addition, in some instances additional query content may also be used to prune scenes (e.g., where a query states "go back to the beach scene," the search may be limited to scenes prior to the current playback position). A query history or dialog may also be incorporated into query analysis in some implementations, e.g., where a user asks "is there a scene with Christmas lights?," an assistant responds in the affirmative, and the user follows up with "seek to it.")

In one non-limiting example where a lighting system 126 is available, where the video content is not found to have a scene that is considered to be a beach scene, then the query "go back to the beach scene" may be interpreted as being a scene display request directed to the lighting system, and may cause a lighting command to be issued to the lighting system to display the requested lighting scene with the one or more lights of the lighting system. In another example, e.g., where no lighting system is available, the query may be used to cause a search to be executed to identify one or more candidate responses for the query included in the spoken utterance, and then cause a given candidate response to be provided for presentation to the user, e.g., to answer the user's query. It will be appreciated that a non-scene playback request may therefore be considered, within the context of the disclosure, to include practically any other type of operation that may be performed by an automated assistant, including performing searches, playing music, commanding smart home devices, etc., e.g., such that the automated assistant may be capable of handling scene playback requests as but one capability among the other capabilities of the automated assistant.

Figure 2:
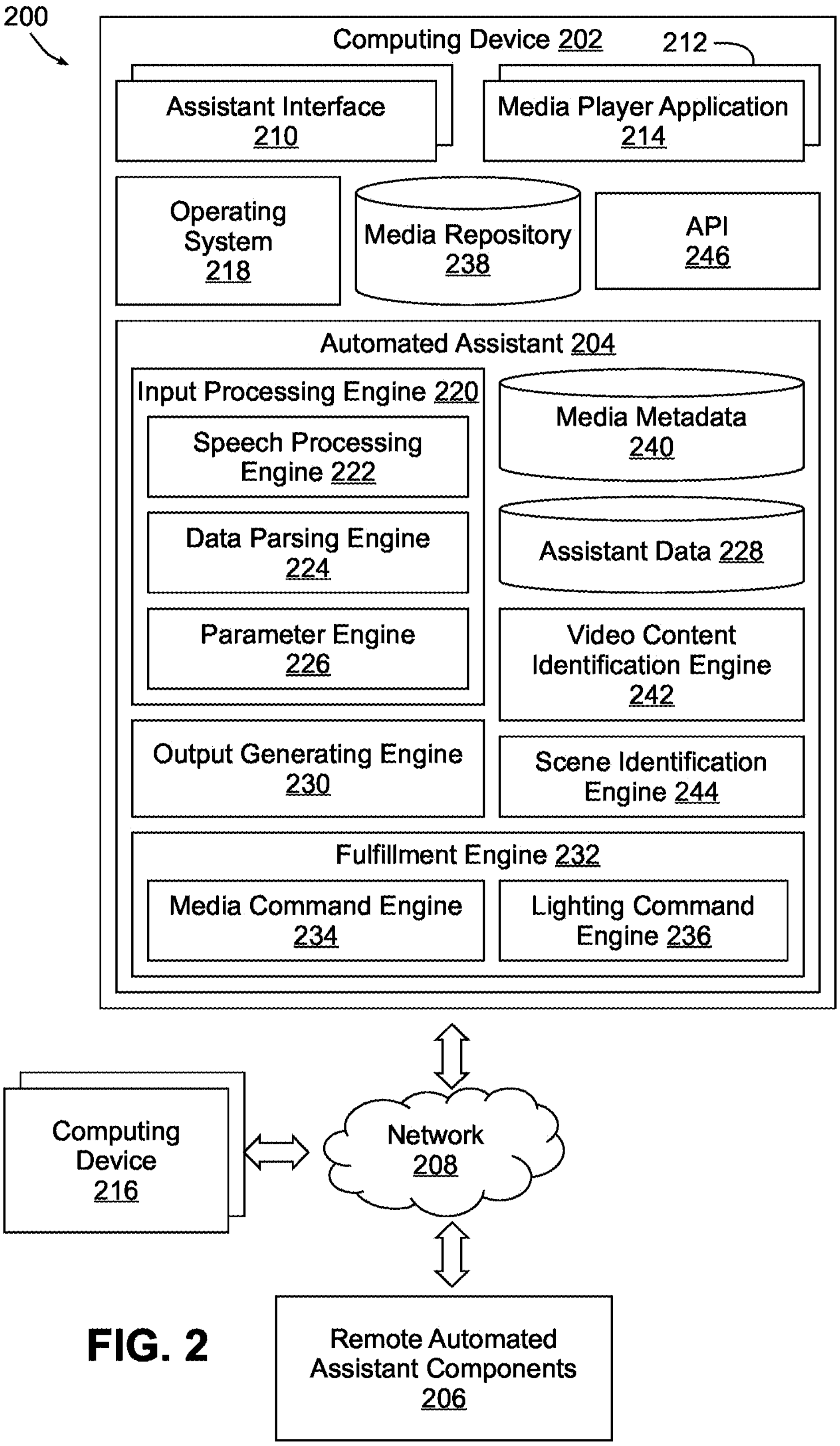
FIG. 2 is a block diagram of another example computing environment in which implementations disclosed herein may be implemented.

Now turning to FIG. 2, a system 200 is illustrated including a computing device 202 incorporating an automated assistant 204 that may be used to implement at least a portion of the functionality associated with voice-based scene selection consistent with some implementations. Automated assistant 204 may operate as part of an assistant application that is provided at one or more computing devices, such as computing device 202 and/or one or more server devices, e.g., as represented by remote automated assistant components 206 that are accessible over a network 208. A user may interact with automated assistant 204 via assistant interface(s) 210, which may be a microphone, a camera, a touch screen display, a user interface, and/or any other apparatus capable of providing an interface between a user and an application. For instance, a user may initialize automated assistant 204 by providing a verbal, textual, and/or a graphical input to an assistant interface 210 to cause automated assistant 204 to perform a function (e.g., provide data, control a peripheral device, access an agent, generate an input and/or an output, etc.). Computing device 202 may include a display device, which may be a display panel that includes a touch interface for receiving touch inputs and/or gestures for allowing a user to control applications 212 of computing device 202 via the touch interface, including, for example, a media player application 214. In some implementations, computing device 202 may lack a display device, thereby providing an audible user interface output, without providing a graphical user interface output. Furthermore, computing device 202 may provide a user interface, such as a microphone, for receiving spoken natural language inputs from a user. In some implementations, computing device 202 may include a touch interface and may be void of a camera and/or a microphone, but may optionally include one or more other sensors.

Computing device 202 and/or other computing devices, e.g., computing devices 216, may be in communication with a server device (e.g., hosting one or more remote automated assistant components 206) over a network 208, such as the internet. Additionally, computing device 202 and any other computing devices 216 may be in communication with each other over a local area network (LAN), such as a Wi-Fi network. Computing device 202 may offload computational tasks to the server device in order to conserve computational resources at computing device 202. For instance, the server device may host automated assistant 204, and/or computing device 202 may transmit inputs received at one or more assistant interfaces 210 to the server device. However, in some implementations, automated assistant 204 may be hosted at computing device 202, and various processes that may be associated with automated assistant operations may be performed at computing device 202.

In various implementations, all or less than all aspects of automated assistant 204 may be implemented on computing device 202. In some of those implementations, aspects of automated assistant 204 are implemented via computing device 202 and may interface with a server device, which may implement other aspects of automated assistant 204. The server device may optionally serve a plurality of users and their associated assistant applications via multiple threads. In implementations where all or less than all aspects of automated assistant 204 are implemented via computing device 202, automated assistant 204 may be an application that is separate from an operating system 218 of computing device 202 (e.g., installed "on top" of the operating system)—or may alternatively be implemented directly by operating system 218 of computing device 202 (e.g., considered an application of, but integral with, the operating system).

In some implementations, automated assistant 204 may include an input processing engine 220, which may employ multiple different modules for processing inputs and/or outputs for computing device 202 and/or a server device. For instance, input processing engine 220 may include a speech processing engine 222, which may process audio data received at an assistant interface 210 to identify the text embodied in the audio data. The audio data may be transmitted from, for example, computing device 202 to the server device in order to preserve computational resources at computing device 202. Additionally, or alternatively, the audio data may be exclusively processed at computing device 202.

The process for converting the audio data to text may include a speech recognition algorithm, which may employ neural networks, and/or statistical models for identifying groups of audio data corresponding to words or phrases. The text converted from the audio data may be parsed by a data parsing engine 224 and made available to automated assistant 204 as textual data that may be used to generate and/or identify command phrase(s), intent(s), action(s), slot value (s), and/or any other content specified by the user. In some implementations, output data provided by data parsing engine 224 may be provided to a parameter engine 226 to determine whether the user provided an input that corresponds to a particular intent, action, and/or routine capable of being performed by automated assistant 204 and/or an application or agent that is capable of being accessed via automated assistant 204. For example, assistant data 228 may be stored at the server device and/or computing device 202, and may include data that defines one or more actions capable of being performed by automated assistant 204, as well as parameters necessary to perform the actions. The parameter engine 226 may generate one or more parameters for an intent, action, and/or slot value, and provide the one or more parameters to an output generating engine 230. Output generating engine 230 may use the one or more parameters to communicate with an assistant interface 210 for providing an output to a user, and/or communicate with one or more applications 212 for providing an output to one or more applications 212.

Thus, input processing engine 220 in some implementations may support on-device speech recognition to generate recognized text for a spoken utterance (if any) present in audio data, as well as on-device natural language understanding (NLU) that processes recognized text, generated using the on-device speech recognition, and optionally contextual data, to generate NLU data. NLU data may include intent(s) that correspond to the spoken utterance and optionally parameter(s) (e.g., slot values) for the intent(s).

On-device fulfillment may be performed using a fulfillment engine 232 that utilizes the NLU data (from the on-device NLU), and optionally other local data, to determine action(s) to take to resolve the intent(s) of the spoken utterance (and optionally the parameter(s) for the intent). This may include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment may then initiate local and/or remote performance/execution of the determined action(s) to resolve the spoken utterance. In some implementations, and as will be discussed in greater detail below, on-device fulfillment may include the generation of media commands, e.g., to media player application 214, using a media command engine 234, as well as lighting commands, e.g., to a lighting system, using a lighting command engine 236.

In various implementations, remote speech processing, remote NLU, and/or remote fulfillment may at least selectively be utilized. For example, recognized text may at least selectively be transmitted to remote automated assistant component(s) 206 for remote NLU and/or remote fulfillment. For instance, the recognized text may optionally be transmitted for remote performance in parallel with on-device performance, or responsive to failure of on-device NLU and/or on-device fulfillment. However, on-device speech processing, on-device NLU, on-device fulfillment, and/or on-device execution may be prioritized at least due to the latency reductions they provide when resolving a spoken utterance (due to no client-server roundtrip(s) being needed to resolve the spoken utterance). Further, on-device functionality may be the only functionality that is available in situations with no or limited network connectivity.

In some implementations, computing device 202 may include one or more applications 212 which may be provided by a third-party entity that is different from an entity that provided computing device 202 and/or automated assistant 204. On such type of application is a media player application 214, which may be used, for example, to play media content such as videos, movies, music, etc., e.g., as stored locally in a media repository 238 and/or streamed from a remote computing device or service accessible via network 208. In some implementations, however, media player application 214 need not be a third party application. Automated assistant 204 and/or computing device 202 may also be configured to detect and response to scene playback requests for media being played by media player application 214, and as such, may include an on-device media metadata repository 240 (e.g., storing semantic scene description data and timestamp data as described above in connection with FIG. 1) as well as on-device video content identification and scene identification engines 242, 244, which respectively attempt to identify video content being presented in the vicinity of a user and attempt to identify a scene in the identified video content in response to a query received by automated assistant 204 during presentation of the video content to the user. Furthermore, an API 246 (e.g., supported by operating system 218, automated assistant 204, and/or media player application 214), may also be provide to facilitate interaction between automated assistant 204 and media player application 214, including, in some instances, an ability to issue media commands to media player application 214 or to receive state information from the media player application, e.g., the current media content being played and/or the location in the media content that is currently being presented. It will be appreciated, however, that in some instances, a media player application on another computing device 216 in the vicinity of computing device 202 may present video content that is identified by video content identification engine 242 (e.g., as a result of an API request and/or video and/or audio analysis of the presentation), and may be controlled by automated assistant 204 using a media control command issued (e.g., through an API) in response to a scene playback request detected by the automated assistant, so while in some instances both the media player application that presents the video content and the automated assistant that receives a scene playback request may be resident in the same computing device, the invention is not limited to control of a media player application that is resident on the same computing device as an automated assistant that receives a scene playback request.

Figure 3:
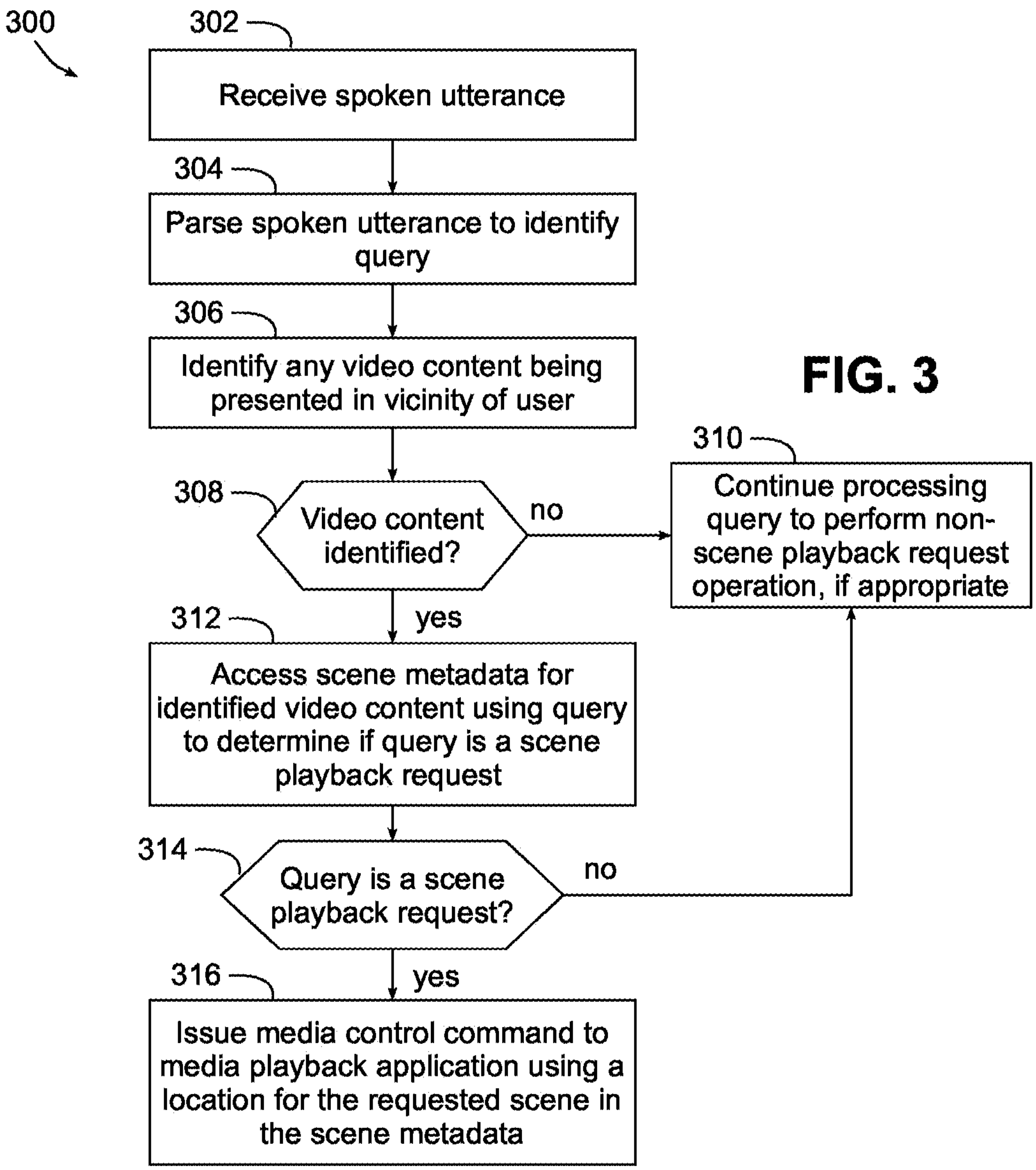
FIG. 3 is a flowchart illustrating an example sequence of operations for performing voice-based scene selection, in accordance with various implementations.

Now turning to FIG. 3, an example sequence of operations 300 for performing voice-based scene selection is illustrated in greater detail. Sequence 300 may be implemented, for example, by a computing device such as computing device 202 of FIG. 2, and utilizing an automated assistant such as automated assistant 204, or by any of the computing devices/automated assistants illustrated in FIG. 1. It will be appreciated that, among other benefits, voice-based scene selection as implemented in this sequence may provide computational and/or communication efficiencies due in part to the fact that a user is better able to locate desired scenes in video content, and may avoid having to manually fast forward, rewind, or otherwise seek through a video content item attempting to find a desired scene, which can require substantial computing resources, and in the event of streamed video content, substantial communication resources, while the user attempts to locate a particular scene in the video content item.

Sequence 300 begins in block 302, where a spoken utterance is received by the automated assistant, and in block 304, where the spoken utterance is parsed to identify a query, e.g., using grammars and/or neural network-based parsers, in some instances attempting to identify whether a user is initiating a media control command and to identify parameters or keywords (e.g., "car chase," "beach scene," "activate yeast," etc.). Block 306 attempts identify video content being presented in a vicinity of the user by a media player application (including video content being presented on the user's mobile device) when the spoken utterance is received from the user, and as noted above, in different implementations, the video content may be presented by a media player application resident on the same computing device upon which the automated assistant executes, or alternatively, on a different computing device in the vicinity of the user. Furthermore, the video content may be identified through specifically requesting the identity of the video content from the media player application (e.g., via an API) and/or through analysis of the video, audio and/or textual content of the video content being presented, or in other suitable manners. In some instances, an entity annotator may be used to normalize and resolve freeform text against a knowledge graph of known content to identify the video content based upon metadata exposed by the media playback application. In addition, in some instances, video, audio and/or text content currently being presented may be processed to attempt to match with various digital fingerprints of different video content. Furthermore, in some implementations, the video content may be identified separate from sequence 300, e.g., in a separate process that executes on a computing device to monitor the video content being presented in the vicinity of the automated assistant, such that block 306 need only determine what video content is currently being presented as detected by the separate process.

If no video content has been identified (as determined in block 308), control passes to block 310 to continue processing the query, e.g., to execute other queries that are ordinarily handled by the automated assistant but that are otherwise irrelevant to voice-based scene selection. Otherwise, control passes to block 312 to access scene metadata associated with the identified video content based upon the query and the identified video content to determine if the query should be handled as a scene playback request, and to determine an appropriate offset in the video content matching the request. Specifically, in some implementations block 312 may attempt to identify a particular scene based upon semantic scene description data associated with that scene and then if so identified, access the timestamp data associated with that scene.

If the query is not determined to be a scene playback request, e.g., as a result of the query not matching a particular scene in the video content or no active video content being played (as determined in block 314), control passes control to block 310 to perform a non-scene playback request operation, which in some instances, may include direct playback controls for the media player application such as play, pause, stop, skip ahead 30 seconds, etc. Otherwise, control passes to block 316 to issue a media control command to the media player application to cause the media player application to seek to a predetermined location in the video content corresponding to the requested scene and identified in the timestamp data of the identified scene. Processing of the spoken utterance is then complete.

Figure 4:
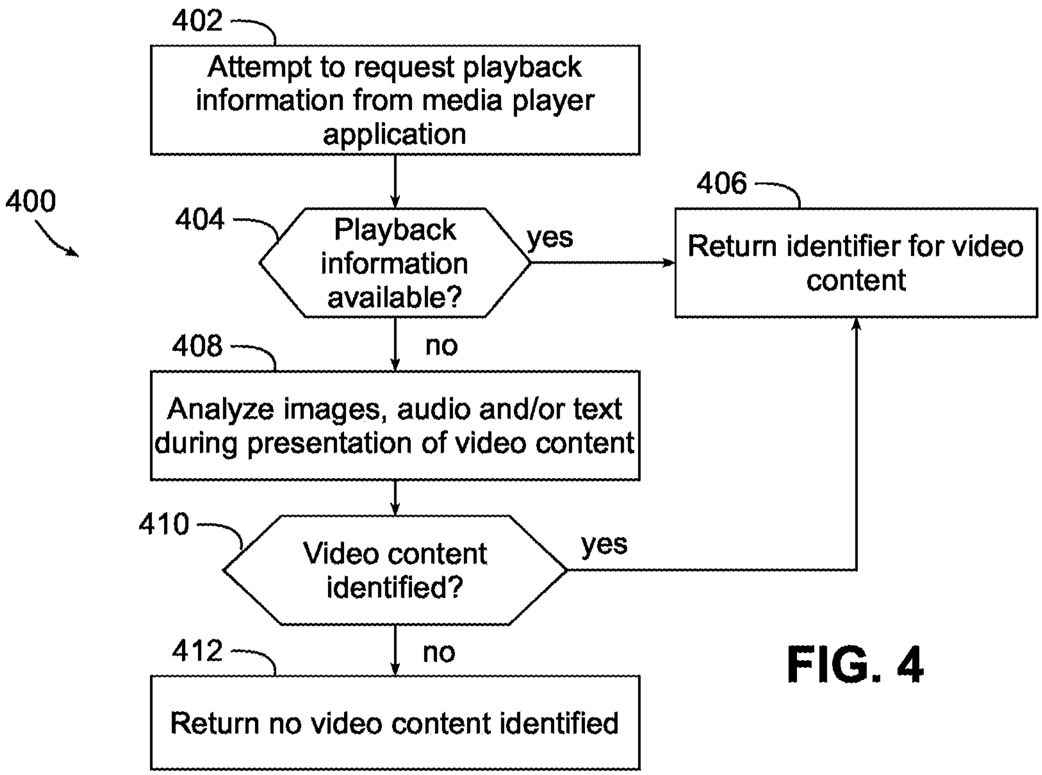
FIG. 4 is a flowchart illustrating an example sequence of operations for identifying video content, in accordance with various implementations.

Now turning to FIG. 4, as discussed above, identification of video content being presented in the vicinity of a user may be implemented in different manners. FIG. 4, in particular, illustrates an example sequence 400 for implementing block 306 of sequence 300 to identify video content. First, in block 402, an attempt may be made to request playback information from the media player application, e.g., through an API. If playback information is available (as determined in block 404), control passes to block 406 to return an identifier for the video content, e.g., as provided by the media player application in response to the request. If playback information is not available, however, control passes to block 408 to perform image, audio, and/or textual analysis of video, audio, and/or textual data of the identified video content presented during playback of the identified video content by the media player application. If, as a result of such analysis (e.g., as determined in block 410), the video content is identified, control passes to block 406 to return an identifier for the video content. If, however, no video content is identified, control passes to block 412 to indicate that no specific video content could be identified.

Figure 5:
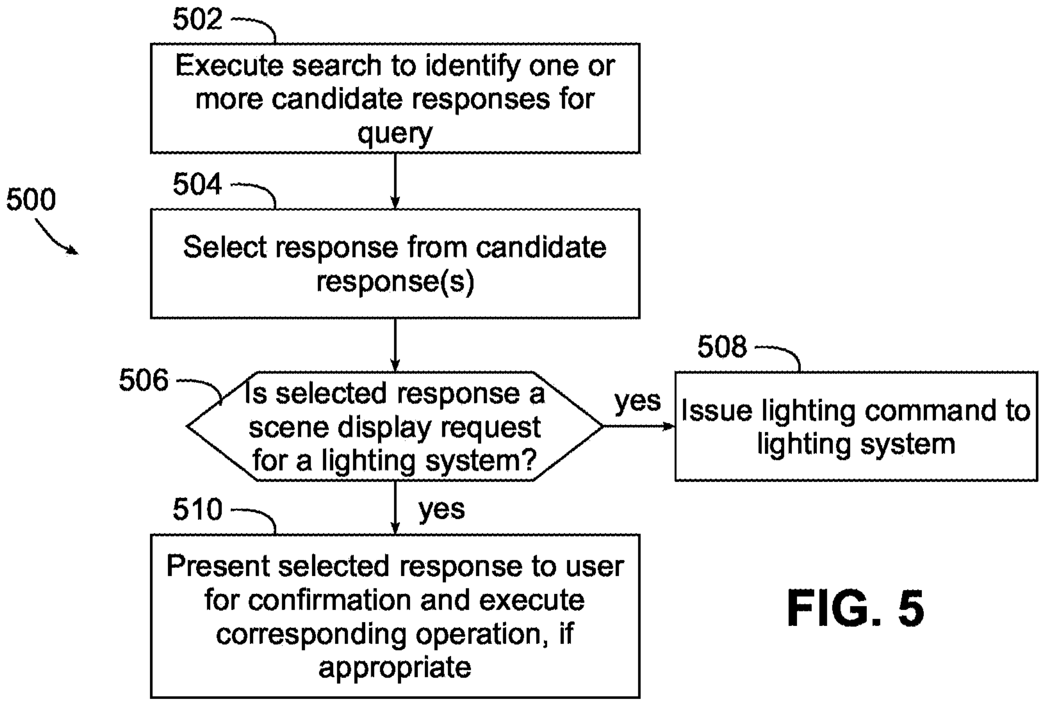
FIG. 5 is a flowchart illustrating an example sequence of operations for performing a non-scene playback request operation, in accordance with various implementations.

Now turning to FIG. 5, as discussed above, an automated assistant may handle a wide variety of other queries that are not relevant to voice-based scene selection. FIG. 5, in particular, illustrates an example sequence 500 for implementing block 310 of sequence 300 to perform a non-scene playback request operation when a query is determined to not be a scene playback request. For example, in block 502, a search may be executed to identify one or more candidate responses for the query, and in block 504, a response may be selected from the identified candidate response(s).

Next, as illustrated in block 506, one particular type of response that may be of particular relevance is a scene display request given the overloaded usage of the term "scene," which can be used to refer not only to a particular point in video content, but also to a particular lighting configuration of a smart home lighting system. A scene display request, in this regard, may be directed to a lighting system to request that the lighting system display a particular lighting scene with one or more lights of the lighting system. A lighting scene, for example, may specify which lights are on and/or which lights are off, and in some instances, the output levels and/or colors of such lights. A user, for example, could set up a "Christmas" lighting scene where lights in one or more rooms of a house are illuminated in red, white and green colors, and it will be appreciated that, for example, if a user issues a spoken utterance such as "show me the Christmas scene," depending upon whether or not video content was being presented to the user at the time of the utterance and, if so, whether a Christmas-related scene was present in the video content, the query generated from such an utterance could be interpreted as either a scene playback request directed at the video content, or a scene display request directed at the lighting system. Other types of lighting scenes could also be created, e.g., party scenes, movie watching scenes, etc.

Thus, if it is determined in block 506 that the query is a scene display request, control passes to block 508 to issue an appropriate lighting command to the lighting system. It will be appreciated that a lighting controller of such a lighting system may provide an API through which such a command may be issued. It may also be appreciated that a lighting controller may be dedicated to a lighting system in some implementations, or may be integrated into a larger smart home automation system, e.g., including door locks, blinds, alarm systems, and other smart devices, so the reference to a lighting controller should not be interpreted as requiring a controller that is dedicated solely to a lighting system. In addition, in some implementations a lighting controller may be a software filter, e.g., to transform an image/video without hardware effects.

Returning to block 506, if the selected response is not a scene display request, control passes to block 510 to present the selected response to the user for confirmation, and to execute the corresponding operation, if appropriate. It will also be appreciated that presentation of a response and requesting user confirmation may also be performed in connection with scene playback requests and/or scene display requests in some implementations.

Figure 6:
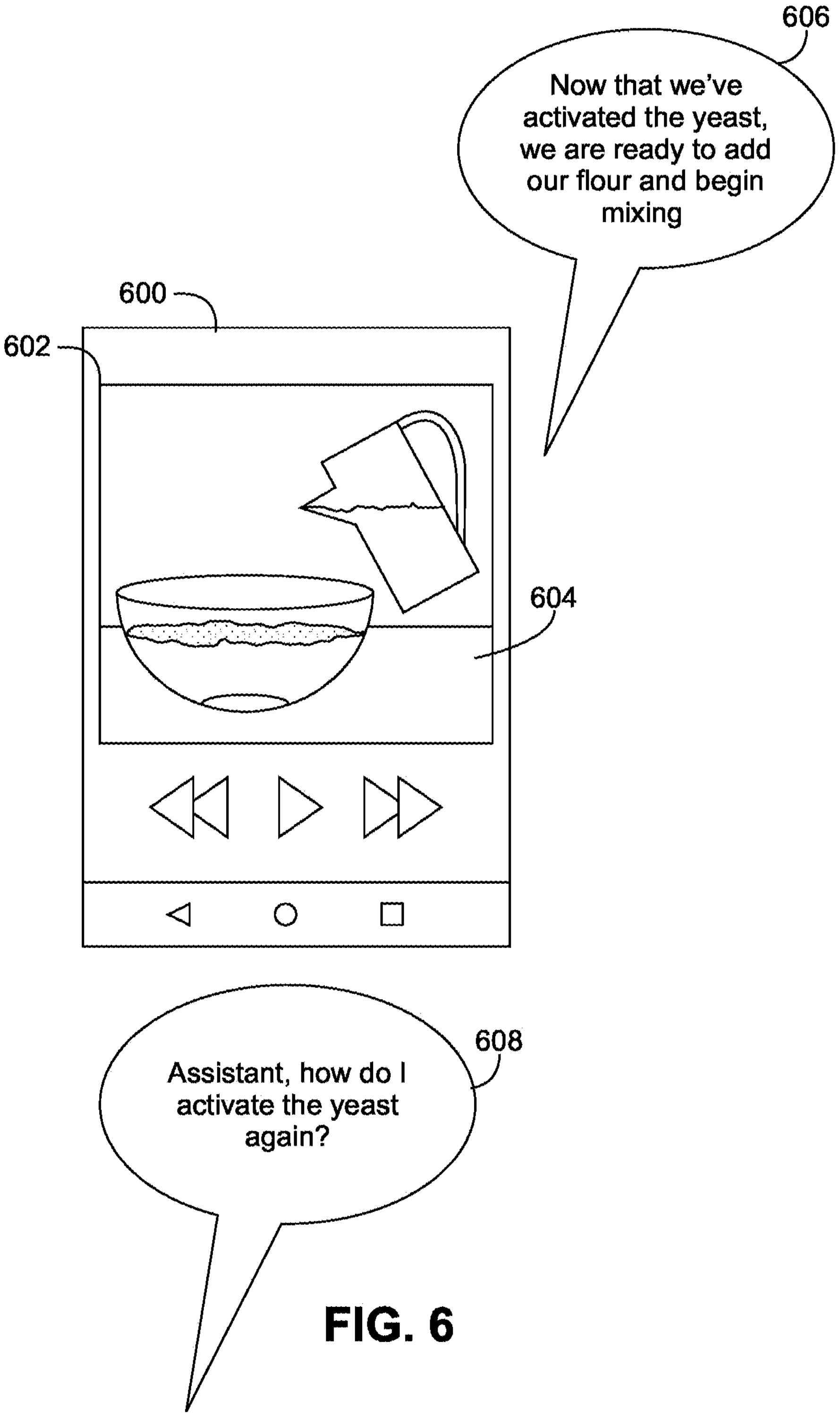
FIG. 6 illustrates an example graphical user interface for use in performing voice-based scene selection, in accordance with various implementations.

Now turning to FIG. 6, this figure illustrates another specific example of voice-based scene selection consistent with some implementations. In this example, a computing device 600, implemented here as a mobile device such as a phone or tablet, upon which is being presented an instructional video, here a baking video 602. In this example, it is assumed that both the media player application and the automated assistant are on the same computing device.

Assume, for example, that a user is watching the baking video 602 while attempting to bake a cake (and as such, the video is being presented in the vicinity of the user), and that the video has reached the point where flour is to be added to a bowl of water and activated yeast, as represented in both the image content 604 (where a cup of flour is shown being poured into the bowl) and the audio content 606 ("now that we've activated the yeast, we are ready to add our flour and begin mixing"). However, the user has either forgotten how to activate the yeast, or has fallen behind the video. The user may issue a spoken utterance 608 ("Assistant, how do I activate the yeast again?"), and assuming that the video content is identified and that metadata is stored for a "yeast activating" scene, the computing device may skip back to the start of the yeast activating scene in response to the spoken utterance, thereby enabling the user to view the scene again, and in many instances, to do so in a hands-free manner, and without having to touch the mobile device with dirty hands.

Figure 7:
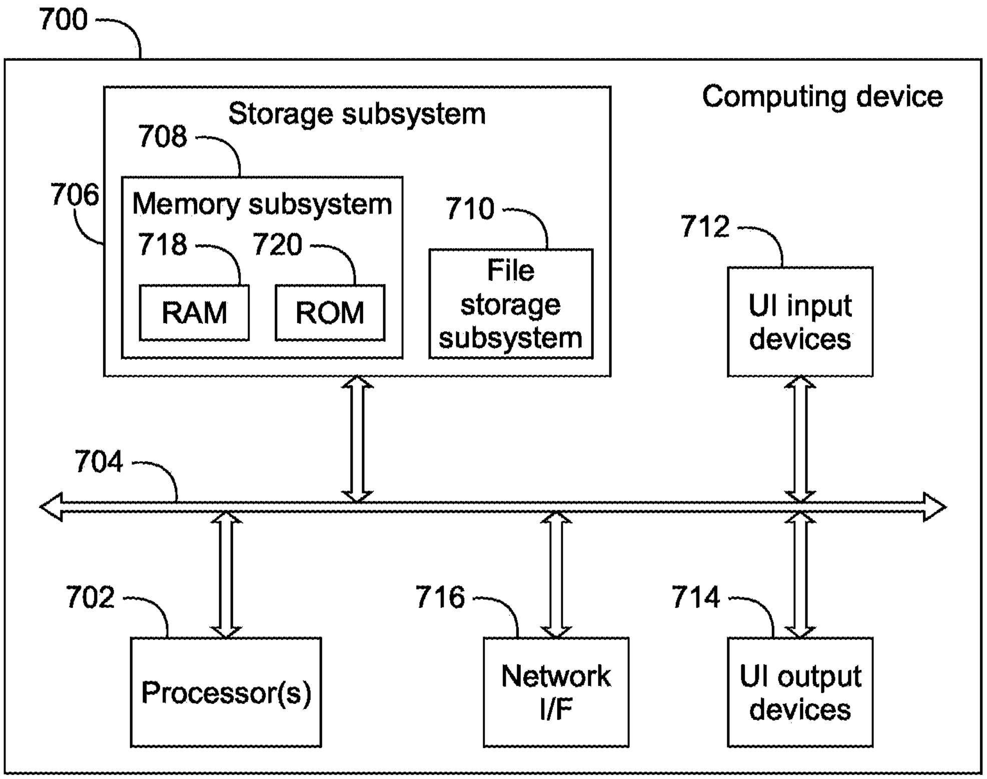
FIG. 7 illustrates an example architecture of a computing device.

FIG. 7 is a block diagram of an example computing device 700 suitable for implementing all or a part of the functionality described herein. Computing device 700 typically includes at least one processor 702 that communicates with a number of peripheral devices via bus subsystem 704. These peripheral devices may include a storage subsystem 706, including, for example, a memory subsystem 708 and a file storage subsystem 710, user interface input devices 712, user interface output devices 714, and a network interface subsystem 716. The input and output devices allow user interaction with computing device 700. Network interface subsystem 716 provides an interface to outside networks and is coupled to corresponding interface devices in other computing devices.

User interface input devices 712 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 700 or onto a communication network.

User interface output devices 714 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 700 to the user or to another machine or computing device.

Storage subsystem 706 stores programming and data constructs that provide the functionality of some or all of the modules described herein. For example, the storage subsystem 706 may include the logic to perform selected aspects of the various sequences illustrated in FIGS. 3-5.

These software modules are generally executed by processor 702 alone or in combination with other processors. Memory 708 used in the storage subsystem 706 can include a number of memories including a main random access memory (RAM) 718 for storage of instructions and data during program execution and a read only memory (ROM) 720 in which fixed instructions are stored. A file storage subsystem 710 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 710 in the storage subsystem 706, or in other machines accessible by the processor(s) 702.

Bus subsystem 704 provides a mechanism for enabling the various components and subsystems of computing device 700 to communicate with each other as intended. Although bus subsystem 704 is shown schematically as a single bus, alternative implementations of the bus subsystem may use multiple busses.

Computing device 700 can be of varying types including a mobile device, a smartphone, a tablet, a laptop computer, a desktop computer, a wearable computer, a programmable electronic device, a set top box, a dedicated assistant device, a workstation, a server, a computing cluster, a blade server, a server farm, or any other data processing system or computing device. Due to the ever-changing nature of computers and networks, the description of computing device 700 depicted in FIG. 7 is intended only as a specific example for purposes of illustrating some implementations. Many other configurations of computing device 700 are possible having more or fewer components than computing device 700 depicted in FIG. 7.

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors comprising:

receiving a first spoken utterance that includes a first query while video content is being presented when the first spoken utterance is received;

identifying the video content in response to receiving the first spoken utterance;

accessing first scene metadata associated with the identified video content, wherein the first scene metadata includes, for each of one or more respective scenes in the identified video content, semantic scene description data describing the respective scene and timestamp data identifying one or more locations in the identified video content corresponding to the respective scene;

determining, based on the first query and the first scene metadata associated with the identified video content, that the first query in the first spoken utterance is a scene playback request to play a requested scene in the identified video content;

in response to determining that the first query in the first spoken utterance is a scene playback request, causing a media control command to be issued to a media player application to cause the media player application to seek to a predetermined location in the identified video content corresponding to the requested scene and identified in the timestamp data of the first scene metadata for the identified video content;

receiving a second spoken utterance that includes a second query while the video content is being presented when the second spoken utterance is received;

identifying the video content in response to receiving the second spoken utterance;

accessing second scene metadata associated with the identified video content, wherein the second scene metadata includes, for each of one or more respective scenes in the identified video content, semantic scene description data describing the respective scene and timestamp data identifying one or more locations in the identified video content corresponding to the respective scene;

determining, based on the second query and the second scene metadata associated with the identified video content, that the second query in the second spoken utterance is not a scene playback request to play a requested scene in the identified video content; and in response to determining that the second query in the second spoken utterance is not a scene playback request, causing a non-scene playback request operation to be executed for the second query included in the second spoken utterance.

2. The method of claim 1, wherein the first and second spoken utterances are received from a first computing device and the media player application executes on a second computing device.

3. The method of claim 2, wherein the first computing device is a mobile phone or assistant computing device in the vicinity of the second computing device.

4. The method of claim 1, wherein identifying the video content includes receiving an identification of the video content from the media player application through an application programming interface (API) supported by the media player application.

5. The method of claim 4, wherein identifying the video content is performed by an automated assistant, and wherein the media player application is a third party application accessible by the automated assistant.

6. The method of claim 1, wherein identifying the video content includes initiating image, audio, and/or textual analysis of video, audio, and/or textual data of the identified video content presented during playback of the identified video content.

7. The method of claim 1, wherein causing the media control command to be issued to the media player application includes causing the media control command to be communicated to the media player application through an application programming interface (API) supported by the media player application.

8. The method of claim 7, wherein causing the media control command to be issued to the media player application is performed by an automated assistant, and wherein the media player application is a third party application accessible by the automated assistant.

9. The method of claim 8, wherein the media player application and the automated assistant execute within a common operating system environment, and wherein the common operating system environment manages issuance of the media control command from the automated assistant to the media player application.

10. The method of claim 1, wherein the non-scene playback request operation includes:

causing a search to be executed to identify one or more candidate responses for the second query included in the second spoken utterance; and causing a given candidate response, from among the one or more candidate responses, to be provided for presentation to a user.

11. The method of claim 1, wherein the non-scene playback request operation includes:

determining, based on the second query, whether the second query in the second spoken utterance is a scene display request directed to a lighting system to display a requested lighting scene with one or more lights of the lighting system; and in response to determining that the second query in the second spoken utterance is a scene display request, causing a lighting command to be issued to the lighting system to display the requested lighting scene with the one or more lights of the lighting system.

12. A system comprising one or more processors and memory operably coupled with the one or more processors, wherein the memory stores instructions that, in response to execution of the instructions by the one or more processors, cause the one or more processors to perform a method that includes:

receiving a first spoken utterance that includes a first query while video content is being presented when the first spoken utterance is received;

identifying the video content in response to receiving the first spoken utterance;

accessing first scene metadata associated with the identified video content, wherein the first scene metadata includes, for each of one or more respective scenes in the identified video content, semantic scene description data describing the respective scene and timestamp data identifying one or more locations in the identified video content corresponding to the respective scene;

determining, based on the first query and the first scene metadata associated with the identified video content, that the first query in the first spoken utterance is a scene playback request to play a requested scene in the identified video content;

in response to determining that the first query in the first spoken utterance is a scene playback request, causing a media control command to be issued to a media player application to cause the media player application to seek to a predetermined location in the identified video content corresponding to the requested scene and identified in the timestamp data of the first scene metadata for the identified video content;

receiving a second spoken utterance that includes a second query while the video content is being presented when the second spoken utterance is received;

identifying the video content in response to receiving the second spoken utterance;

accessing second scene metadata associated with the identified video content, wherein the second scene metadata includes, for each of one or more respective scenes in the identified video content, semantic scene description data describing the respective scene and timestamp data identifying one or more locations in the identified video content corresponding to the respective scene;

determining, based on the second query and the second scene metadata associated with the identified video content, that the second query in the second spoken utterance is not a scene playback request to play a requested scene in the identified video content; and in response to determining that the second query in the second spoken utterance is not a scene playback request, causing a non-scene playback request operation to be executed for the second query included in the second spoken utterance.

13. The system of claim 12, wherein the first and second spoken utterances are received from a first computing device and the media player application executes on a second computing device, and the first computing device is a mobile phone or assistant computing device in the vicinity of the second computing device.

14. The system of claim 12, wherein the one or more processors identify the video content by receiving an identification of the video content from the media player application through an application programming interface (API) supported by the media player application.

15. The system of claim 14, wherein the one or more processors execute an automated assistant that identifies the video content, and the media player application is a third party application accessible by the automated assistant.

16. The system of claim 12, wherein the one or more processors identify the video content by initiating image and/or audio analysis of video and/or audio data of the identified video content presented during playback of the identified video content by the media player application.

17. The system of claim 12, wherein the one or more processors cause the media control command to be issued to the media player application by causing the media control command to be communicated to the media player application through an application programming interface (API) supported by the media player application.

18. The system of claim 17, wherein the one or more processors execute an automated assistant that causes the media control command to be issued to the media player application, and wherein the media player application is a third party application accessible by the automated assistant.

19. The system of claim 12, wherein the non-scene playback request operation includes:

causing a search to be executed to identify one or more candidate responses for the second query included in the second spoken utterance; and causing a given candidate response, from among the one or more candidate responses, to be provided for presentation to a user.

20. The system of claim 12, wherein the non-scene playback request operation includes:

determining, based on the second query, whether the second query in the second spoken utterance is a scene display request directed to a lighting system to display a requested lighting scene with one or more lights of the lighting system; and in response to determining that the second query in the second spoken utterance is a scene display request, causing a lighting command to be issued to the lighting system to display the requested lighting scene with the one or more lights of the lighting system.

* * * * *